(12) United States Patent
Loyen et al.

(10) Patent No.: US 8,039,525 B2
(45) Date of Patent: Oct. 18, 2011

(54) GRAFTING ONTO A POLYAMIDE POWDER BY GAMMA-IRRADIATION

(75) Inventors: Karine Loyen, Pont-Audemer (FR); Herve Ster, Serquigny (FR); Holger Senff, Serquigny (FR); Thomas Fine, Serquigny (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/771,632

(22) Filed: Apr. 30, 2010

(65) Prior Publication Data

US 2010/0305232 A1    Dec. 2, 2010

Related U.S. Application Data

(62) Division of application No. 11/341,158, filed on Jan. 27, 2006, now abandoned.

(30) Foreign Application Priority Data

Jan. 28, 2005   (FR) .................................... 05.00885

(51) Int. Cl.
    *C08J 3/28*   (2006.01)
    *C08F 2/46*   (2006.01)
(52) U.S. Cl. ......... 522/114; 522/120; 522/135; 522/141
(58) Field of Classification Search .......... 427/496–521;
    522/113–125, 135, 136, 137, 139, 141, 142,
    522/143, 144
    See application file for complete search history.

(56) References Cited

U.S. PATENT DOCUMENTS

| | | | |
|---|---|---|---|
| 3,862,265 A | 1/1975 | Steinkamp et al. | |
| 4,775,721 A | 10/1988 | Horikawa et al. | |
| 4,929,682 A | 5/1990 | Banzi et al. | |
| 5,612,097 A * | 3/1997 | Foerch et al. | 427/491 |
| 5,652,281 A * | 7/1997 | Galli et al. | 522/114 |
| 5,736,610 A | 4/1998 | Nishi et al. | |
| 5,756,199 A * | 5/1998 | Kerbow et al. | 428/327 |
| 5,830,604 A * | 11/1998 | Singleton et al. | 429/254 |
| 5,866,673 A * | 2/1999 | Muller et al. | 528/310 |
| 6,284,335 B1 | 9/2001 | Spohn | |
| 6,306,975 B1 | 10/2001 | Zhao et al. | |
| 6,451,919 B1 | 9/2002 | Aglietto et al. | |
| 7,144,979 B2 * | 12/2006 | Maeji et al. | 528/480 |
| 7,722,899 B2 | 5/2010 | Ono et al. | |
| 2002/0042349 A1 | 4/2002 | Boden et al. | |
| 2002/0177828 A1 | 11/2002 | Batich et al. | |
| 2005/0033251 A1 | 2/2005 | Toreki et al. | |

FOREIGN PATENT DOCUMENTS

WO    WO 99/24483    5/1999

* cited by examiner

*Primary Examiner* — Susan W Berman
(74) *Attorney, Agent, or Firm* — Thomas F. Roland

(57) ABSTRACT

The subject of the invention is a process for producing polyamide, copolyamide, polyolefin, copolyester amide or fluorocarbon resin powder particles on to the surface of which has been grafted at least one functionalized grafting monomer, characterized in that it comprises: a) a step of blending the polyamide or copolyamide powder particles with the functionalized grafting monomer; followed by b) a step of irradiating the powder impregnated with functionalized grafting monomer resulting from a) with photons (γ-radiation) or electrons (β-radiation), with a dose ranging from 0.5 to 15 Mrad. The invention also relates to the particles grafted in this way and to the compositions containing such particles.

6 Claims, 2 Drawing Sheets

Legends

P : Powder particle
⟩ : Functional group of a 1st graft used for grafting said graft onto P
⊃ : Functional group of the graft used for compatibilizing the grafted P in a medium (FIGURE 1) or for reacting with the functional group [○] of a 2nd graft (FIGURE 2)
∼∼ : Carbon chain of the graft
⟩∼∼⊂ : At least bifunctionalized graft
∼∼○ : At least monofunctionalized graft

GRAFTING ONTO A POLYAMIDE POWDER BY GAMMA-IRRADIATION

This application is a divisional application of copending U.S. Ser. No. 11/341,158 filed Jan. 27, 2006, and claims benefit, under U.S.C. §119(a) of French National Application Number 05.00885, filed Jan. 28, 2005, all applications incorporated herein by reference.

BACKGROUND OF THE INVENTION

The invention lies in the field of powder particles consisting of polyamide (abbreviated to PA) or copolyamide (abbreviated to coPA), whether or not block copolyamides, especially copolyester amides, polyolefins (polyethylene abbreviated to PE or polypropylene abbreviated to PP), polyester or fluorocarbon resins, among others, directly grafted onto the surface of which are grafts that are at least bifunctional molecules. One block coPA is a polyether-block-amide (abbreviated to PEBA).

One of the functional groups of said molecule allows this molecule to be grafted onto a particle of the abovementioned polymers.

The other functional group, which is free, will, depending on its chemical nature, be used to compatibilize the grafted particle with the medium to which the latter will be attached via covalent bonds or physical bonds. It will even allow chemical reactions between the grafted particle and another functionalized molecule.

BACKGROUND OF THE INVENTION

Within the context of surface coatings, such as UV-crosslinkable coatings, polyester coatings, polyurethane coatings and acrylic coatings, among others, it is important to have an abrasion-resistant and scratch-resistant material and more generally to improve the mechanical resistance properties of the coating. This resistance is provided by the addition in these media (UV-crosslinkable, polyester, polyurethane or acrylic medium) of elements known for their mechanical resistance properties, such as polyamide or copolyamide powders.

The same problem arises in hydrophilic media, namely that of the compatibility of the hydrophobic PA or coPA powders that are added to these media.

Methods for functionalizing polyamide powders, in order to improve their compatibility with coatings, do exist. In most cases, this consists in introducing a functional compound into the polymer during its polymerization. However, the copolymerization of these functional compounds is often difficult to control, resulting in non-uniform distributions. Furthermore, the many process steps (grinding, drying, screening, etc.) often have to be adapted so as to preserve the reactivity of these functional compounds until the final powder is obtained.

It is therefore important to have polymer, particularly PA or coPA, powder particles that are compatible in various media, it being possible for this compatibility to be rapidly provided, in few steps and according to the customer's requirements, on a base product sold on a large scale, namely the polymer. This method of compatibilization must be applicable for all polyamide or copolyamide powders, independently of their production process.

The technical problem to be solved is a problem of compatibility between these media and said polymer powders, particularly PA or coPA powders, and of preservation of the active principles in the one medium without them being able to migrate out of said medium.

The Applicant has therefore discovered the possibility of adding powder particles to media, particularly polyamide or copolyamide particles, that are rendered compatible with such media by a grafting process carried out downstream of the production of said powders. This compatibility is made possible thanks to a process for grafting at least bifunctionalized grafts onto the powder particles, which make the powder particles reactive or compatible with respect to the media in which they may subsequently be added.

For example, in the case of a hydrophilic medium, the grafting onto a hydrophobic polyamide or copolyamide particle of a graft having a hydrophilic functional group makes it easier to disperse the particle in said medium, giving this particle hydrophilic properties.

The functionalization of the powder by grafting may be used to directly modify the surface properties of polymer, particularly polyamide or copolyamide, powders.

SUMMARY OF THE INVENTION

One subject of the invention is a process for producing surface-grafted powder particles, characterized in that it comprises:
  a) a step of blending said powder particles with at least one functionalized grafting monomer, said powder particles being polyamide (PA), copolyamide (coPA), polyether-block-amide (PEBA), polyolefin, polyester or fluorocarbon resin particles, followed by;
  b) a step of irradiating the powder impregnated with functionalized grafting monomer resulting from a) with photons (γ-radiation) or electrons (β-radiation), with a dose ranging from 0.5 to 15 Mrad.

According to one method of implementation, after step b), a step c) is carried out that consists in removing all or some of the grafting monomer that has not been grafted onto the powder during step b).

According to one method of implementation, the powder particles are polyamide, copolyamide or polyether-block-amide (PEBA) powder particles.

According to one method of implementation, the functionalized grafting monomer introduced during step a) is a bifunctionalized grafting monomer comprising at least a first functional group having at least one ethylenically unsaturated moiety capable of reacting with the particle on which the grafting is carried out and at least a second functional group that can react via a covalent or physical bond.

According to one method of implementation, after step c), a step d) is carried out that consists in introducing an at least monofunctionalized second graft comprising at least one functional group capable of reacting with the second functional group of the bifunctionalized grafting monomer.

According to one method of implementation, the reactive second functional group of the bifunctionalized grafting monomer introduced during step a) is chosen from a carboxylic acid functional group and its ester, anhydride, acid chloride, amide, ketone, isocyanate, oxazoline, epoxide, amine or hydroxide derivatives.

According to one method of implementation, the bifunctionalized grafting monomer introduced during step a) is maleic anhydride or methacrylic anhydride.

Another subject of the invention is a polyamide (PA), copolyamide (coPA), polyether-block-amide (PEBA), polyolefin, polyester or fluorocarbon resin powder particle, grafted onto the surface of which is at least one grafting monomer functionalized by at least one reactive functional group.

The invention may also relate to a polyamide (PA), copolyamide (coPA), polyether-block-amide (PEBA), polyolefin, polyester or fluorocarbon resin powder particle, grafted onto the surface of which are at least two grafting monomers each functionalized by at least one different reactive functional group.

According to one embodiment of the particles, the functionalized grafting monomer(s) is(are) an at least bifunctionalized grafting monomer comprising at least a first functional group having at least one ethylenically unsaturated moiety capable of reacting with the particle on which the grafting is carried out and at least a reactive second functional group capable of reacting via a covalent or physical bond.

According to one embodiment of the particles, the at least bifunctionalized grafting monomer is linked to an at least monofunctionalized second graft, said graft comprising at least one functional group capable of reacting with the second functional group of the bifunctionalized grafting monomer via a covalent or physical bond.

According to one embodiment, the polyamide powder particle is chosen from PA-6, PA-6,6, PA-11 and PA-12.

According to one embodiment of the particles, the reactive functional group of the functionalized grafting monomer(s) is chosen from a carboxylic acid functional group and its ester, anhydride, acid chloride, amide, ketone, isocyanate, oxazoline, epoxide, amine or hydroxide derivatives.

According to one embodiment of the particles, the functionalized grafting monomer is functionalized by at least one reactive functional group having biocidal and/or biostatic properties.

The invention also relates to a composition comprising particles as described above.

It also relates to the use of powder particles as described above for improving the adhesion of polymer, preferably PA, coPA or PEBA, particles to substrates such as paper, cellulose or keratinous substance of skin, nails, head hair and body hair.

According to one embodiment, the invention relates to the use of powder particles as described above in cosmetic compositions, to improve the slipperiness and/or silkiness.

According to one embodiment, the invention relates to the use of powder particles as described above in order to promote a soft-touch effect.

According to one embodiment, the invention relates to the use of powder particles, characterized in that the at least monofunctionalized second graft is chosen from UV filters, free-radical scavengers, moisturizers, dyes, self-tanning agents and nanoparticles (elementary grain diameters≦100 nm) surface-coated with a treatment compatible with the second functional group of the at least bifunctionalized grafting monomer.

Figure 1:
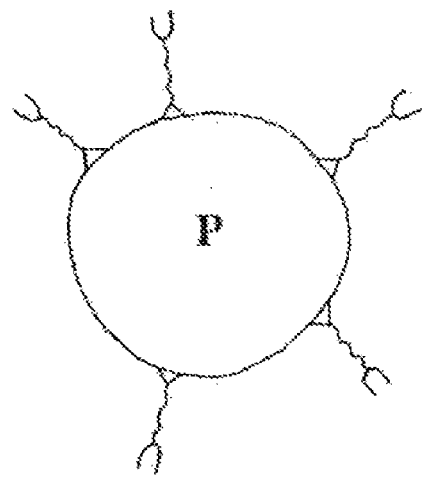
FIG. 1 shows, in cross section, a particle (P) onto the surface of which a first bifunctionalized graft has been grafted.
Figure 2:
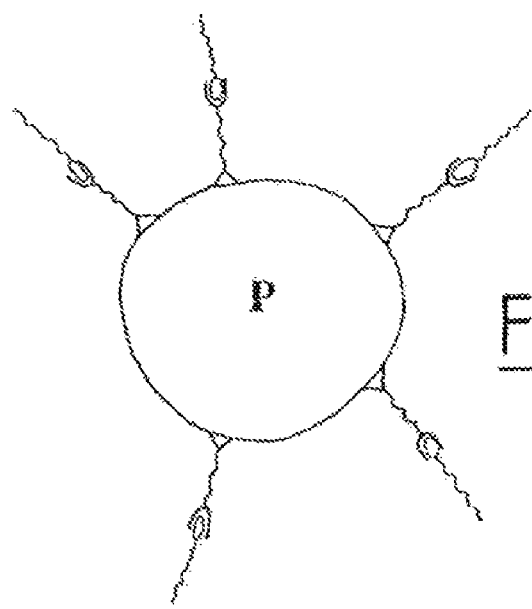
FIG. 2 shows, again in cross section, the same particle as previously, but with a monofunctionalized 2nd graft also grafted onto it, this being achieved via an inter-graft reaction, the functional group of the first graft grafted onto the particle (P) of FIG. 1 that has remained free having reacted with the functional group of the 2nd graft in order to form the grafted particle of FIG. 2.

As regards the functionalized grafting monomer, this is a molecule having at least two functional groups, namely:
  at least a first functional group having at least one ethylenically unsaturated moiety such as a double bond capable of reacting with the particle on which the grafting is carried out; and
  at least a reactive second functional group compatible with the medium to which the particle may subsequently be added, and in particular a reactive functional group capable of reacting with said medium. The molecule or graft may be said to be at least bifunctional or bifunctionalized.

The second functional group depends on the medium to which the grafted particle according to the invention will be added. Thus, this second functional group is a lipophilic group in the case of a medium having a fatty phase and is a hydrophilic group in the case of a medium having an aqueous phase.

For the purpose of the invention, a fatty phase is a phase containing oils or organic solvents that are liquids at room temperature (RT=20 to 25° C.) and an aqueous phase is a phase containing water to which is optionally added a water-soluble monohydric or polyhydric alcohol (methanol, n-propanol, isopropanol, isobutanol, glycerol).

It is also possible to use the grafting to give the particles an amphiphilic character, combining lipophilic and hydrophilic properties. Such particles may advantageously be used in emulsions (dispersions of a fatty phase in a continuous aqueous phase, or vice versa, namely dispersions of an aqueous phase in a continuous fatty phase) and may help to stabilize these complex systems.

As lipophilic second functional group according to the invention, mention may be made of hydrocarbon chains (containing 2 to 20 carbon atoms) silicone chains (containing 2 to 20 Si—O groups) and fluorinated and/or fluorosilicone chains.

As hydrophilic second functional group according to the invention, mention may be made of amine, carbonyl, cyano, oxazole, epoxy and hydroxyl functional groups, and combinations thereof.

As examples of reactive functional groups, mention may be made of carboxylic acids and their ester, anhydride, acid chloride, amide, ketone, isocyanate, oxazoline, epoxide, amine or hydroxide derivatives.

Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids. Undecylenic acid may also be mentioned.

Unsaturated dicarboxylic acids having 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides.

Examples of other grafting monomers comprise:

$C_1$-$C_{22}$ alkyl esters, glycidyl ester derivatives or fluorinated ester derivatives of unsaturated carboxylic acids, such as methyl acrylate, methyl methacrylate, ethyl acrylate, ethyl methacrylate, butyl acrylate, butyl methacrylate, nonyl acrylate, nonyl methacrylate, 2-ethylhexyl acrylate, 2-ethylhexyl methacrylate, glycidyl acrylate, glycidyl methacrylate, monoethyl maleate, diethyl maleate, monomethyl fumarate, dimethyl fumarate, monomethyl itaconate, diethyl itaconate, trifluoroethyl methacrylate and hexafluoroethyl acrylate (or AC8n);

amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-monoethylamide of fumaric acid, the N,N-diethylamide of fumaric acid, the N-monobutylamide of fumaric acid and the N,N-dibutylamide of fumaric acid;

imide derivatives of unsaturated carboxylic acids, such as maleimide, N-butylmaleimide and N-phenylmaleimide;

metal salts of unsaturated carboxylic acids, such as sodium acrylate, sodium methacrylate, potassium acrylate and potassium methacrylate; and alkoxysilanes carrying an unsaturated group, such as vinyltrialkoxysilanes of formula $CH_2=CH-Si-(OR)_3$, where R represents an alkyl or alkoxyl group, or ((meth)acryloxyalkyl)trialkoxysilanes.

Mention may also be made of:

polyallyl esters of carboxylic acids and other triallyl cyanurate, triallyl isocyanurate, triallyl phosphate and triallyl trimellitate esters;

acrylic and methacrylic esters of polyhydric alcohols: ethylene glycol dimethacrylate, (1,3)-trimethacrylate-2-ethyl(hydroxymethyl)propanediol; and amides and acrylamides: N-acrylamide and N,N'-methylenebisacrylamide.

Advantageously, maleic anhydride or methacrylic anhydride is used.

The process of grafting onto the powder particles according to the invention may be carried out in one or two steps. We shall refer to "functionalized grafted powder" and "functionalized powder", the two terms meaning the same thing.

The process of grafting onto the polymer, particularly PA of coPA, powder particles may be carried out in a single step. At least bifunctional molecules are therefore firstly grafted onto the surface of the powder particles via a first functional group, the second functional group remaining free. This second functional group, depending on its chemical nature, may form covalent bonds or physical bonds with respect to the medium (for example a coating) to which the powder particle thus grafted will subsequently be added.

One operating method or grafting process according to the invention is the following:

Step a)

The functionalized grafting monomer is dissolved in a preferably volatile solvent in order to be able to be subsequently removed by vacuum evaporation or by any other means at relatively low temperatures (preferably below 50° C.).

The solvents used may for example be ethanol, acetone, hexane, cyclohexane or water.

The solution obtained is then introduced drop by drop onto the powder, as described above, and kept stirred so as to disperse the functionalized grafting monomer uniformly throughout the powder. The solvent is then evaporated, completely or partly, under vacuum and at a moderate temperature.

Step b)

The powder impregnated with functionalized grafting monomer is packed into a preferably sealed container and irradiated, preferably in the absence of air, with photons (γ-radiation) or electrons (β-radiation) with a dose of between 1 and 15 Mrad. Preferably, γ-radiation is used.

Step c)

To finish, the powder may optionally be washed, so as to remove all or part of the functionalized grafting monomer that has not been grafted onto the powder during the previous step.

Within the context of particle functionalization, it is not always possible to graft the desired functionalities. It is therefore necessary in this case to use a two-step grafting process. During a first step (i), an at least bifunctional first graft is firstly grafted onto a polymer particle, in particular a PA or coPA particle, this first graft being a molecule containing at least a first functional group that serves for grafting the graft onto said particle and at least a second functional group that remains free, and then (ii) said functional group of the first graft that has remained free is made to react with an at least monofunctional second graft, the latter being a molecule containing at least one functional group that will react with the functional group of the first graft that has remained free. This second graft provides the desired properties for subsequent applications of the particle.

Following steps a), b), or a), b) and c), a step d) is carried out that consists in introducing an at least monofunctionalized second grafting monomer, the grafting monomer introduced during step a) being itself at least bifunctionalized. The grafting of the second graft onto the first graft takes place via conventional organic chemistry reactions well known to those skilled in the art.

With regard to the powder on which the grafting is carried out, mention may be made of powders of polyamides (PA), copolyamides (coPA), particularly block coPA or PEBA, especially copolyester amides, polyolefins (namely polyethylene or polypropylene), polyesters or fluorocarbon resins. Preferably, polyamide or copolyamide powders are used for carrying out the grafting.

The term "polyamides" is understood to mean the products resulting from the condensation:

of one or more amino acids, such as aminocaproic, 7-aminoheptanoic, 11-aminoundecanoic and 12-aminododecanoic acids; or of one or more lactams, such as caprolactam, oenantholactam and lauryllactam; or of one or more salts or mixtures of diamines, such as hexamethylenediamine, dodecamethylenediamine, metaxylylenediamine, bis-p(aminocyclohexyl)methane and trimethylhexamethylenediamine with diacids such as isophthalic, terephthalic, adipic, azelaic, suberic, sebacic and dodecanedicarboxylic acids.

By way of examples of a polyamide, mention may be made of PA-6, PA-6,6, PA-11 and PA-12.

As regards the copolyamide powders, mention may be made of the copolyamides resulting from the condensation of at least two alpha, omega-aminocarboxylic acids or of two lactams, or of a lactam and an alpha, omega-aminocarboxylic acid. Mention may also be made of the copolyamides resulting from the condensation of at least one alpha, omega-aminocarboxylic acid (or a lactam), at least one diamine and at least one dicarboxylic acid. Mention may also be made of the copolyamides resulting from the condensation of an aliphatic diamine with an aliphatic dicarboxylic acid and at least one other monomer chosen from aliphatic diamines differing from the first one and aliphatic diacids differing from the first one.

By way of examples of lactams, mention may be made of those having from 3 to 12 carbon atoms in the main ring and possibly being substituted. Mention may be made, for example, of β,β-dimethylpropriolactam, α,α-dimethylpropriolactam, amylolactam, caprolactam, capryllactam and lauryllactam.

By way of examples of alpha, omega-aminocarboxylic acids, mention may be made of aminoundecanoic acid and aminododecanoic acid.

By way of examples of dicarboxylic acids, mention may be made of dicarboxylic acids having at least 4 carbon atoms: adipic acid, sebacic acid, isophthalic acid, butanedioic acid, 1,4-cyclohexyldicarboxylic acid, terephthalic acid, the sodium or lithium, salt of sulphoisophthalic acid, dimerized fatty acids having a dimer content of at least 98% (they are preferably hydrogenated) and dodecanedioic acid HOOC—$(CH_2)_{10}$—COOH.

The diamine may be an aliphatic diamine having from 6 to 12 carbon atoms and it may be an aryl diamine and/or a saturated cyclic diamine. By way of examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4 amino-cyclohexyl)methane (BMACM).

By way of examples of copolyamides, mention may be made of copolymers of caprolactam and lauryllactam (PA-6/12), copolymers of caprolactam, adipic acid and hexamethylenediamine (PA-6/6,6), copolymers of caprolactam, lauryllactam, adipic acid and hexamethylenediamine (PA-6/12/6,6), copolymers of caprolactam, lauryllactam, 11-aminoundecanoic acid, azelaic acid and hexamethylenediamine (PA-6/6,9/11/12), copolymers of caprolactam, lauryllactam, 11-aminoundecanoic acid, adipic acid and hexamethylenediamine (PA-6/6,6/11/12) and copolymers of lauryllactam, azelaic acid and hexamethylenediamine (PA-6,9/12).

With regard to polyether-block-amide (PEBA) copolyamides, these comprise polyamide (PA) blocks and polyether (PE) blocks of general formula (I):

-[PA-X,Y-PE]$_n$-  (I)

in which:
PA-X,Y represents a polyamide block obtained by polycondensation of a linear aliphatic diamine having X carbon atoms and of a dicarboxylic acid having Y carbon atoms;
PE represents a polyether block;
n represents the number of PA-X,Y-PE units,
characterized in that:
X is at least equal to 2;
Y is at least equal to 2;
the PE blocks being either:
(i) diol PE blocks (that is to say having hydroxyl end groups) so that the bonds between the PA-X,Y blocks having carboxylic end groups and the diol PE blocks are ester bonds, in which case the polymers are referred to as polyether ester amides, or (ii) PE blocks having two NH$_2$ ends (that is to say diamines) in the case in which they react with the PA-X,Y blocks having carboxylic end groups, so that the bonds between the PA-X,Y blocks having carboxylic end groups and the diamine PE blocks are amide bonds.

Preferably X is between 6 and 10, limits inclusive, and Y is between 10 and 20, limits inclusive.

The PA-X,Y polyamide block is advantageously chosen from nylon-6,10, nylon-6,12, nylon-6,14, nylon-6,18, nylon-10,10 and nylon-10,12 polyamide blocks. The polyether block is advantageously derived from at least one polyalkylene ether polyol, especially a polyalkylene ether dial. The polyalkylene ether diol is more particularly chosen from polyethylene glycol, polypropylene glycol (PPG), polytrimethylene glycol (PO3G), polytetramethylene glycol (PTMG) and blends thereof.

It is also possible to use copolyester amide powders comprising, in moles (the total being 100%):
1 to 98% of a lactam;
1 to 98% of a lactone; and, optionally,
1 to 98% of another lactam,
and which have a diameter ranging from 1 μm to 200 μm and a specific surface area ranging from 1 to 25 m$^2$/g.

As examples of lactams, mention may be made of those having from 3 to 12 carbon atoms on the main ring, it being possible for these atoms to be substituted. For example, mention may be made of β,β-dimethylpropiolactam, α,α-dimethylpropiolactam, amylolactam, caprolactam, capryllactam and lauryllactam. Advantageously, caprolactam and lauryllactam are used.

As examples of lactones, mention may be made of caprolactone, valerolactone and butyrolactone. It is advantageous to use caprolactone.

The method of preparing these copolyester amide powders by anionic polymerization is described in document EP 1 172 396.

It is possible to use polyamide and/or copolyamide blends. These are for example blends of aliphatic polyamides and semiaromatic polyamides, and blends of aliphatic polyamides and cycloaliphatic polyamides.

The powders may be manufactured by any means—dissolution and precipitation in an alcohol. Advantageously, they are produced by solvent polymerization, the powders being insoluble in the solvent used. Mention may be made of the process described in EP 192 515 and EP 303 530.

With regard to fluorocarbon resins, these are PTFE (polytetrafluoroethylene), FEP (fluorinated ethylene-propylene), PFA (perfluoroalkoxy), PVDF (polyvinylidene fluoride), ETFE (modified ethylene/tetrafluoro ethylene copolymer) and ECTFE (ethylene/chlorotrifluoroethylene) polymers. The PTFE, FEP and PFA polymers are often called Teflon®, the name of the trade mark registered by DuPont de Nemours for all the fluorocarbon resins, films and products manufactured by that company. Mention may be made of PTFE powders (Series SST™ from Shamrock).

With regard to polyolefin (for example polyethylene and polypropylene) powders and PTFE/polyolefin powder blends, mention may especially be made of polyethylene powders from Shamrock (S-series™) or from Lubrizol and PTFE/polyethylene powder blends from Shamrock (FluoroSLIP™).

With regard to polyester powders, these are obtained from the condensation of monofunctional or polyfunctional acids, anhydrides, polyols and sometimes esters. For example, mention may in particular be made of polyester powders from DSM (Uralac™) or DuPont.

We will now describe in greater detail one method of implementation.

In Examples 1 and 2, we will describe the preparation of a powder of PA particles functionalized with methacrylic anhydride, which improves the compatibility of this powder with UV-crosslinkable coatings.

To carry out the trials, a powder P1 (PA-12 powder with a mean particle diameter of the order of 10 µm±2 µm, with less than 5% of fine particles with a diameter less than 5 µm and less than 2% of coarse particles of diameter greater than 20 µm, and apparent specific surface area of less than 4 m$^2$/g, a bulk density of 0.20-0.35 g/cm$^3$, a true density of 1.03 g/cm$^3$ and a melting point of 175-179° C.) was used.

EXAMPLE 1

50 g of a 0.2 wt % solution of methacrylic anhydride in cyclohexane was prepared. 99.9 g of polyamide powder P1 were then impregnated with this solution. The cyclohexane was then removed by vacuum drying. A powder containing 0.1 wt % methacrylic anhydride as grafting monomer was thus obtained.

The grafting was carried out according to the process described above. The powder impregnated with functionalized grafting monomer was placed in a sealed flask, in a nitrogen atmosphere. It was exposed to photon (γ) radiation with a dose of 30 kGray (1 Mrad (megarad)=10 kGray). A powder of grafted PA particles was thus obtained.

EXAMPLE 2

50 g of a 0.8 wt % solution of methacrylic anhydride in cyclohexane was prepared. 99.6 g of polyamide powder P1 were then impregnated with this solution. The cyclohexane was then removed by vacuum drying. A powder containing 0.4 wt % methacrylic anhydride as grafting monomer was thus obtained.

The grafting was carried out according to the process described above. The powder impregnated with functionalized grafting monomer was placed in a sealed flask, in a nitrogen atmosphere. It was exposed to photon (γ) radiation with a dose of 50 kGray. A powder of grafted PA particles was thus obtained.

The grafted particle powders thus obtained (EXAMPLE 1 and EXAMPLE 2) were then tested below as additive in a UV-crosslinkable varnish formulation, and compared with the initial powder P1. To do this, the powders were dispersed with a content of 2 wt % in a varnish, the formulation of which is given in TABLE 1 below.

TABLE 1

| Components | Nature | Mass (g) |
| --- | --- | --- |
| CN 981 (Cray Valley) | Aliphatic oligomer Urethane-diacrylate | 30.0 |
| SR 506 D (Sartomer) | Isobornyl acrylate | 12.8 |
| SR 238 (Sartomer) | 1,6-hexanediol diacrylate | 33.7 |
| SR 454 (Sartomer) | Ethoxylated (3OE) trimethylolpropane triacrylate | 5 |
| SR 399 (Sartomer) | Dipentaerythritol pentaacrylate | 5 |
| CN 385 (Cray Valley) | Benzophenone | 2.7 |
| Darocur 1173 (Ciba Specialties) | Photo initiator | 1.8 |

The varnish was applied to a flat surface with a thickness of 24 µm and then crosslinked in a UV tunnel. Its abrasion resistance was then tested according to the ISO 9352 standard on a TABER abrasion meter fitted with CS17 abrasion wheels, under a load of 500 g. The weight loss brought about by the rubbing of the wheels on the coating was measured every 100 cycles.

TABLE 2 gives the mean weight losses for 100 cycles, measured respectively on the additive-free varnish (CONTROL 1) and on the varnishes containing the following additives:
   powder P1 (CONTROL 2);
   monomer-impregnated powder P1, having undergone only step a) (CONTROL 3); and
   grafted and functionalized powder P1, having undergone the process described above, that is to say steps a) and b) (EXAMPLE 1).

TABLE 2

| | MEAN WEIGHT LOSS FOR 100 CYCLES (mg) |
| --- | --- |
| CONTROL 1 | 1.9 |
| CONTROL 2 | 1.4 |
| CONTROL 3 | 1.5 |
| EXAMPLE 1 | 0.7 |

Comparing CONTROLS 2-3 with EXAMPLE 1 according to the invention shows that there is a substantial improvement in the physical properties of the varnish with respect to abrasion. Specifically, the mean weight loss for 100 revolutions is reduced by a factor of 2, indicating a significant improvement in the abrasion resistance of the material.

TABLE 3 gives the number of wear cycles needed to reach the substrate, determined respectively on the additive-free varnish (CONTROL 1) and on the varnishes containing the following additives:
   powder P1 (CONTROL 2);
   grafted and functionalized powder P1 having undergone the process described above, that is to say steps a) and b) (EXAMPLE 2).

TABLE 3

| | NUMBER OF CYCLES TO REACH THE SUBSTRATE |
| --- | --- |
| CONTROL 1 | 300 |
| CONTROL 2 | 400 |
| EXAMPLE 2 | 1000 |

Comparing CONTROL 2 with EXAMPLE 2 according to the invention shows that there is an appreciable improvement in the physical properties of the varnish with respect to abrasion.

A third example was produced and relates to the modification of the hydrophobicity of the PA powders.

To carry out the trials, a powder P1 (PA-12 powder with a mean particle diameter of around 10 µm±2 µm, with less than 5% of fine particles with a diameter of <5 µm and less than 2% of coarse particles with diameters greater than 20 µm, an apparent specific surface area of less than 4 m$^2$/g, a bulk density of 0.20-0.35 g/cm$^3$, a true density of 1.03 g/cm$^3$ and a melting point of 175-179° C.) was used and 3% by weight (Example 3) or 5% by weight (Example 4) of polyethylene glycol methacrylate of 5000 g/mol molar mass was used as grafting monomer. The grafting was carried out according to the process described above. The solvent used was water. Examples 3 and 4 were subjected to steps a), b) and c).

To test the modified hydrophobicity of the powders, measurements were made of the variation in contact angle between a water drop and the powders as a function of time, and also the variation in the volume of water of the drop deposited on the powders as a function of time. To do this, the powders were compacted, cold, in a press so as to obtain pellets about 1 cm in diameter. The contact angle measurements were carried out using a Digidrop DGD Fast60 instrument.

Figure 3:
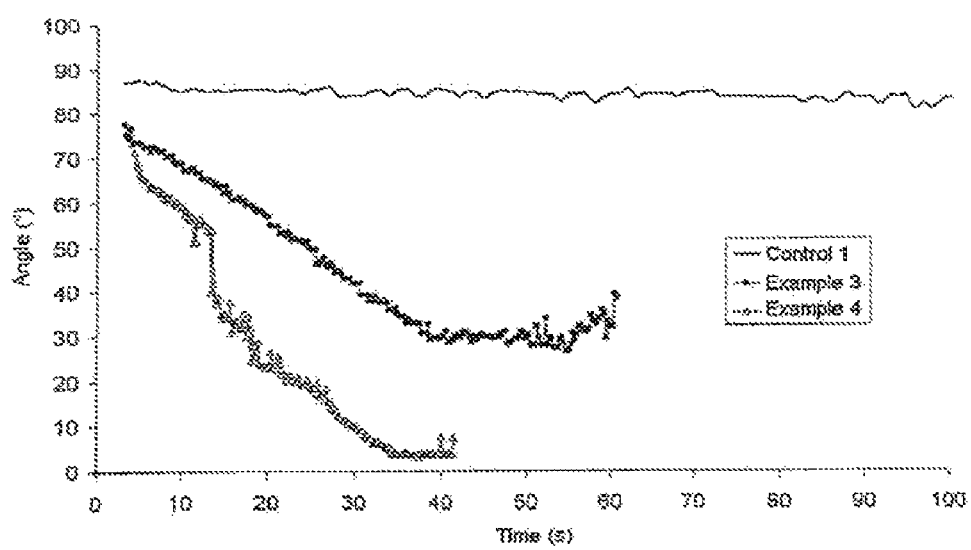
FIG. 3 shows the variation in the contact angle as a function of time for an unmodified (control) powder and two modified powders.
Figure 4:
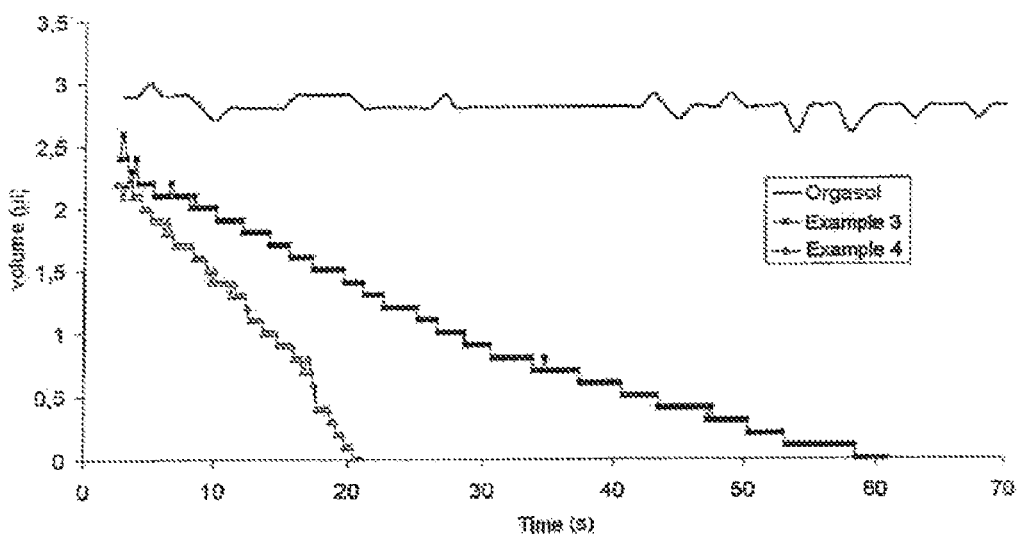
FIG. 4 shows the variation in water volume of the deposited drop as a function of time for an unmodified (control) powder and two modified powders.

What was therefore observed, as shown in FIGS. 3 and 4, was the appearance of hydrophilic behavior in the modified powders, the contact angle with the water drop being smaller for both examples. It may also be seen that this modification allows very significant water absorption (Examples 3 and 4), whereas in the unmodified powder the volume of the water drop does not change.

One of the advantages of the grafted particles according to the invention is that any type of particle can be used in any type of medium. This makes it possible, for formulations in the cosmetic, pharmaceutical, paint, coating or electronics fields, to increase the ranges of products and make them easier to process.

The grafted particles according to the invention may be used inter alia:

- as additives in coatings (for example in varnishes and paints) allowing both physical and chemical compatibility with the coating: a potential reactive site is created on the surface of the powder by means of a functionalized first graft, which will allow the powder to be attached onto the coating. Moreover, depending on the content of reactive molecules grafted onto the surface of the powder particles, it is not excluded to create a compatibility layer between the powder and the coating. These functionalized powders are useful as they improve the abrasion resistance and scratch resistance and they increase the mechanical resistance of the coating;
- as an additive in materials in order to improve their mechanical properties, used as such in thermosetting materials;
- as such, as a coating on a substrate after they have been melted. In the latter case, they may optionally be diluted in ungrafted PA, coPA, polyolefin, copolyester amide or fluoropolymer powders (such as PVDF or Teflon®) before being melted;
- to improve the adhesion of polymer powder particles, in particular PA or coPA powders, on various types of substrate. Cationic functionalization makes it possible to improve the physical adhesion to surfaces, such as paper, cellulose, keratinous substances of the skin, lips, nails, head hair, body hair, etc.;
- in cosmetic applications. It is possible to use this surface functionality to improve the feel of the powder, to improve the slipperiness, to promote silkiness and to promote a soft-touch effect. It is also possible to use this functionality in order to make the introduction of the powders into lipophilic or hydrophilic formulations or into emulsions easier. In particular, the functionality may be advantageously used to give the particles an amphiphilic character, which could then have a stabilizing effect on the emulsions into which they are introduced;
- in biocide applications (in which biocides kill microbes) or biostatic applications (in which biostats stop or limit microbe proliferation), it is possible to introduce biocidal and/or biostatic functions into the medium in which the polymer, particularly polyamide or copolyamide, particles are placed, by grafting onto them grafts having a biocidal and/or biostatic functionality, such as quaternary ammonium, zirconium phosphate, calcium phosphate, Zn or Zn/Ag complex compounds, etc.; and
- as support for an active principle, whatever its nature (cosmetic, biocidal, biostatic, pharmaceutical, etc.), the active principle being unable to be separated from the particle and therefore unable by itself to migrate into the medium in which it is placed. This has an advantage in cosmetic applications by limiting the penetration of active principles, such as irritants, for example UV filters, into the lipid layers of the skin or by promoting the retention of active principles at the surface of the skin, such as free-radical scavengers, moisturizers, dyes, self-tanning agents and nanoparticles (with elementary grain diameters $\leq 100$ nm) that are covered on the surface by a treatment compatible with grafting onto the powder particle, said treated nanoparticles preferably being capable of reacting with the second functional group of the first graft. The grafted particles support the active principle, which remains on the surface of said lipid layers of the skin. Preferably, these will be the grafted particles according to the invention that will have undergone the two-step grafting process, the second graft being the active principle.

What is claimed is:

1. A process for producing surface-grafted powder particles, comprising the steps of:
   a) blending powder particles with at least one functionalized grafting monomer to produce a powder impregnated with functionalised grafting monomer, said powder particles being selected from the group consisting of polyamide (PA), copolyamide (coPA), polyether-block-amide (PEBA), polyolefin, and polyester resin particles, have a diameter ranging from 1 µm to 200 µm, followed by;
   b) irradiating the powder impregnated with functionalized grafting monomer resulting from a) with photons (γ-radiation) or electrons (β-radiation), with a dose ranging from 0.5 to 15 Mrad, optionally followed by
   c) optionally removing all or some of the grafting monomer that has not been grafted onto the powder during step b).

2. The process according to claim 1, wherein the powder particles are polyamide, copolyamide or poly-block-amide.

3. The process according to claim 1, wherein the functionalized grafting monomer introduced during step a) is a bifunetionalized grafting monomer comprising at least a first functional group having at least one ethylenically unsaturated moity capable of reacting with the particle on which the grafting is carried out and at least a second functional group that can react via a covalent or physical bond.

4. The process according to claim 3, comprising a 2-step grafting process, wherein after step b) or optional c), a step d) is carried out comprising introducing a second functionalized grafting monomer comprising at least one functional group capable of reacting with the second functional group of the bifunctionalized grafting monomer.

5. The process according to claim 4, wherein the reactive second functional group of the bifunctionalized grafting monomer introduced during step a) is chosen from a carboxylic acid functional group and its ester, anhydride, acid chloride, amide, ketone, isocyanate, oxazoline, epoxide, amine or hydroxide derivatives.

6. The process according to claim 1, wherein the bifunctionalized grafting monomer introduced during step a) is maleic anhydride or methacrylic anhydride.

* * * * *